(12) United States Patent
Cahill

(10) Patent No.: US 8,630,753 B2
(45) Date of Patent: Jan. 14, 2014

(54) METHOD FOR DYNAMIC DETERMINATION OF THE TRUE MASS OF A NON RIGID BODY SUBJECT TO LOW FREQUENCY NOISE

(75) Inventor: Bret Edward Cahill, Imperial, CA (US)

(73) Assignee: Bret E. Cahill, Imperial, CA (US)

( * ) Notice: Subject to any disclaimer, the term of this patent is extended or adjusted under 35 U.S.C. 154(b) by 0 days.

(21) Appl. No.: 13/444,169

(22) Filed: Apr. 11, 2012

(65) Prior Publication Data

US 2012/0265366 A1    Oct. 18, 2012

Related U.S. Application Data

(60) Provisional application No. 61/517,144, filed on Apr. 13, 2011.

(51) Int. Cl.
*G05D 1/08* (2006.01)
(52) U.S. Cl.
USPC .............................................................. 701/7
(58) Field of Classification Search
None
See application file for complete search history.

(56) References Cited

U.S. PATENT DOCUMENTS

| 5,526,045 A * | 6/1996 | Oshima et al. ............. 348/208.5 |
| 7,261,194 B2 * | 8/2007 | Fox ............................... 188/275 |
| 2012/0265366 A1 * | 10/2012 | Cahill ............................... 701/1 |

* cited by examiner

*Primary Examiner* — Thomas Tarcza
*Assistant Examiner* — Adam Alharbi

(57) ABSTRACT

A dynamic method to accurately determine the mass of a vehicle which deforms on acceleration and is subject to low frequency noise is disclosed. Only the greater than zero hertz frequencies of the signals are processed. Both signals are squelched during periods of high jerk to reduce the error between true mass and apparent mass. For a single body or combination vehicle such as a semi-rig with a propulsive body of known mass a reference for matched or Wiener filtering is constructed from the noisy signals to filter low frequency noise. A towing vehicle with a fifth wheel mounted on a dedicated load sensing apparatus can, therefore, determine the weight of any semi-trailer towed on any terrain of any inclination and any changing inclination with the greatest precision in the shortest possible time.

19 Claims, 8 Drawing Sheets

$F(t) = ma(t)$

Fig. 1-A

Key for operator symbols on all flow charts

⊣⊢  offset filter      $\int dt$  time integral      $d(\ )/dt$  time derivative
∥   rectify            LPF  low pass filter Offset filtered signals are in boldface where time dependence is assumed

Fig. 2-A

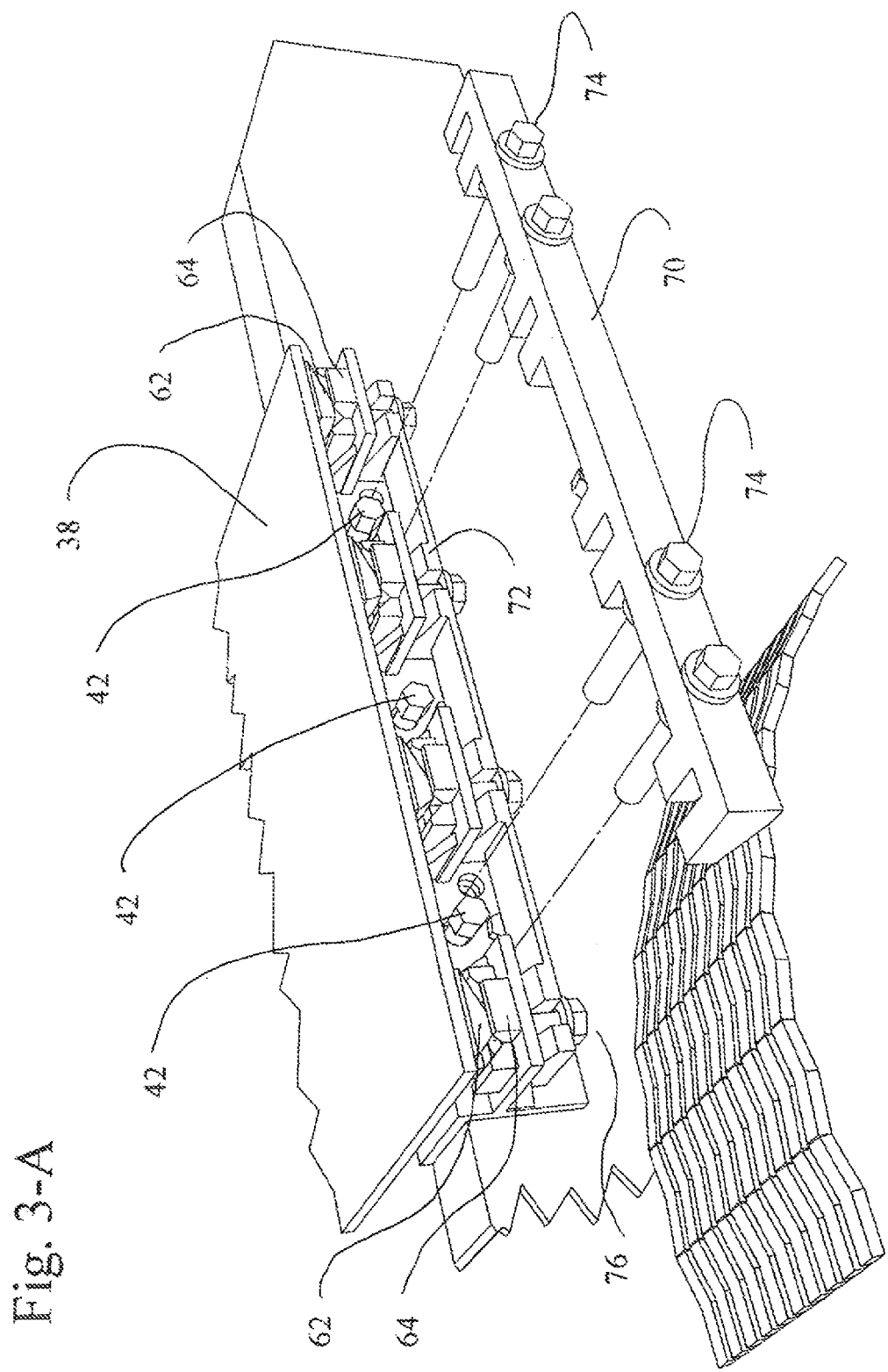

$f_t = l_t / l_b$
$f_c = l_p / l_b$

Figure 4:
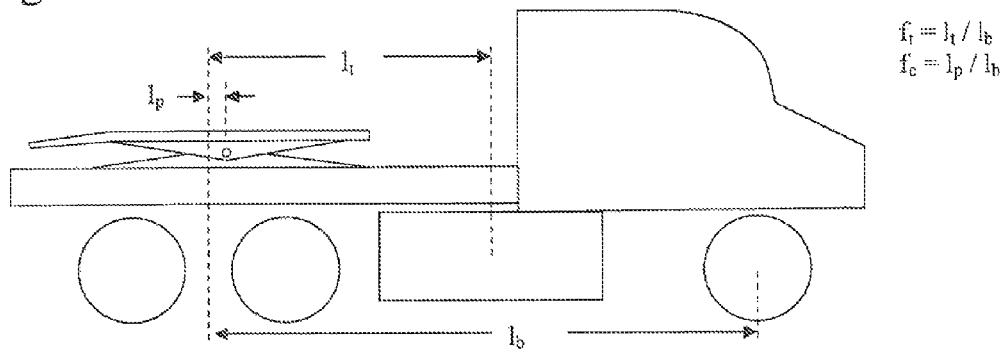
Figure 4:
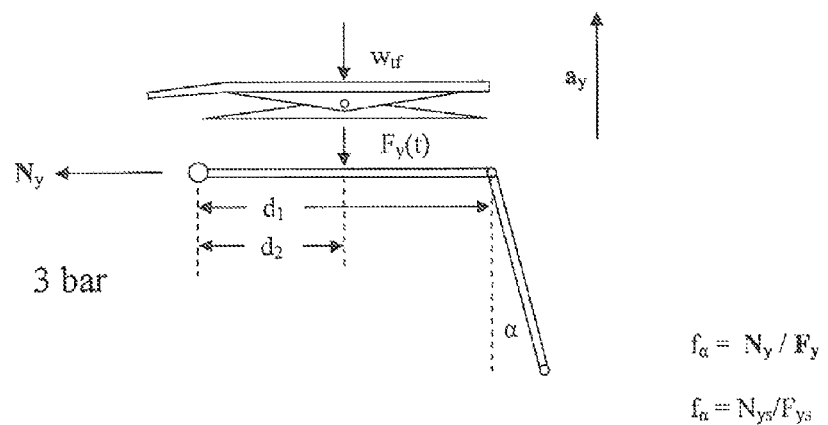
Figure 4:
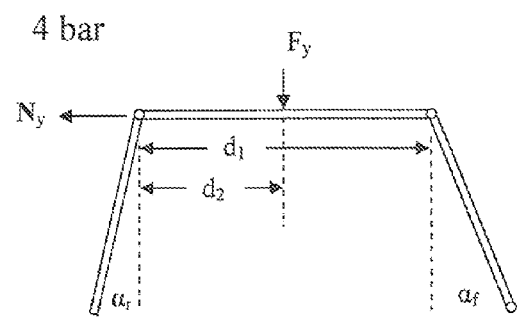

Fig. 4-A 3 bar $f_\alpha = N_y / F_y$
$f_\alpha = N_{ys}/F_{ys}$

Fig. 4-B 4 bar

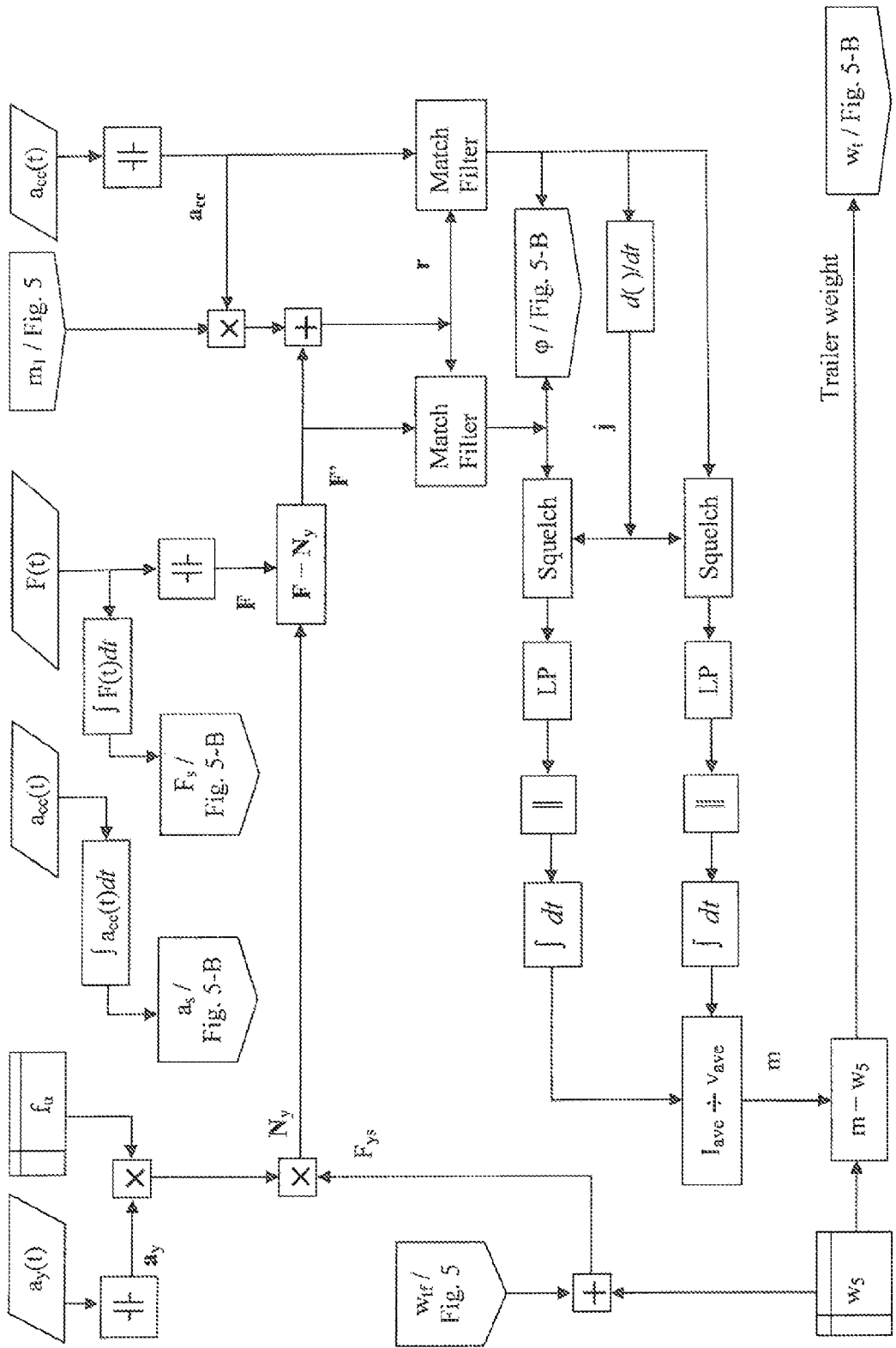

Figure 5:
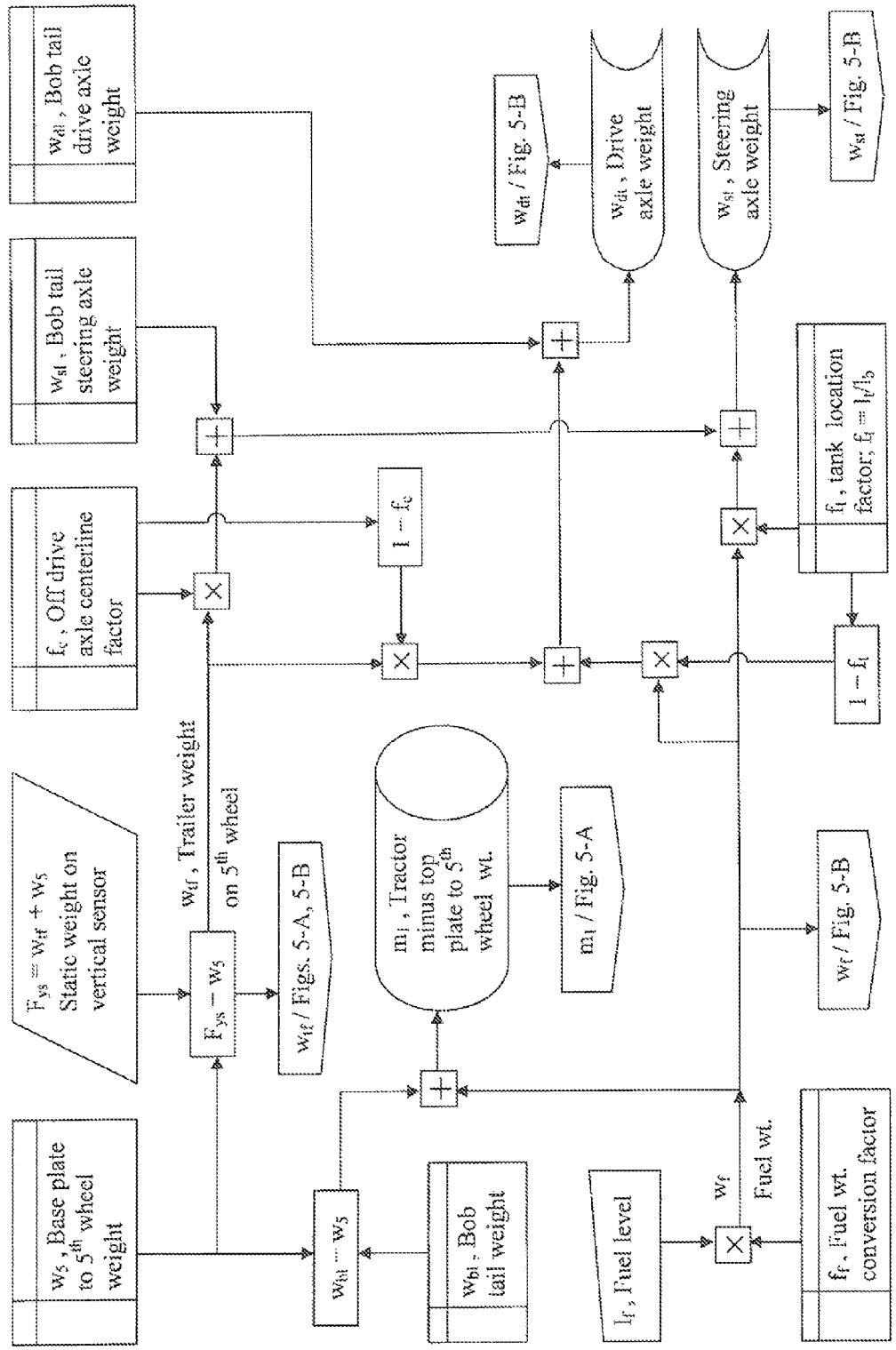

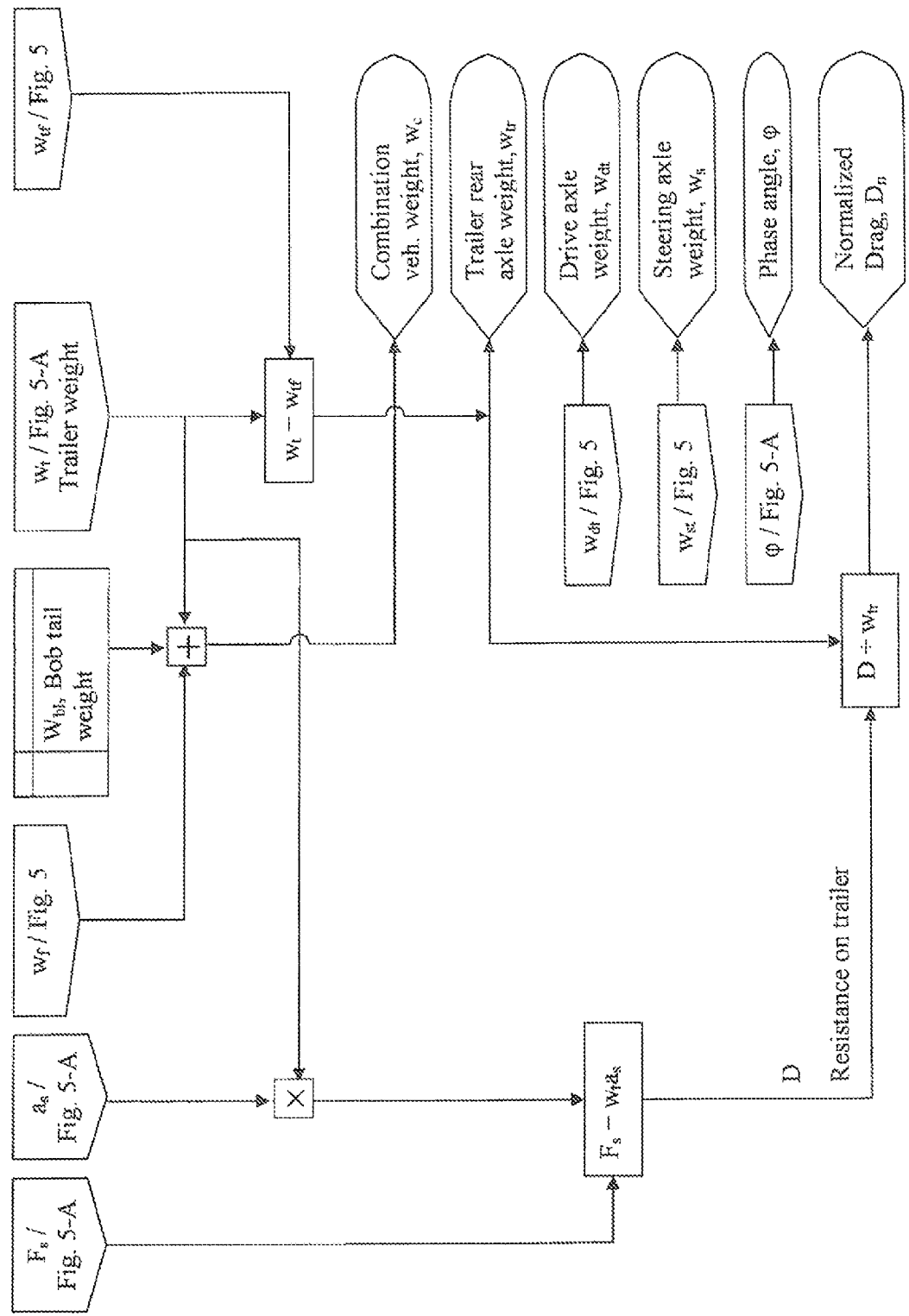
Fig. 5-B

METHOD FOR DYNAMIC DETERMINATION OF THE TRUE MASS OF A NON RIGID BODY SUBJECT TO LOW FREQUENCY NOISE

CROSS-REFERENCES TO RELATED APPLICATIONS

This application is entitled to the benefit of Provisional Patent Application Ser. No. 61/517,144, filed on 2011 Apr. 13.

BACKGROUND

1. Field of Invention

This invention relates to dynamic determinations of true mass of a body that deforms internally under acceleration and is subject to noise. More specifically still this invention relates to determining the mass of a vehicle by dynamic methods when a signal is corrupted by low frequency noise. Most specifically this invention relates to methods and apparatus installed under a fifth wheel hitch to accurately determine the weight of a semi-trailer on paved roads or agricultural fields.

2. Description of Prior Art

Weight restrictions on heavy commercial vehicles require precision weighing of vehicles, often in locations where a bridge scale is not convenient. Drive train efficiency also depends on knowledge of vehicle mass. Crop yield maps used in precision agriculture rely on near real time mass determinations during harvest operations. Finally, the quality of product may suffer without real time semi-trailer weights during field loadings. Trailers are loaded and weighed and overloaded trailers are off-loaded onto hot pavement. Fresh produce may sit in the sun for hours before being scooped up and dumped into an under loaded trailer.

All efforts at designing on-board scales fall under static or dynamic methods or some combination of those two. Static measurements have two advantages over the dynamic methods in the prior art. Internal deformation is not an issue under the constant acceleration of gravity and any noise above the single zero hertz frequency can be simply, quickly and easily low pass filtered. On the other hand all static methods require installing transducers on the frame or suspension of each wheel. See U.S. Pat. No. 5,393,936 (Tyhy, et. al.) for force transducers and U.S. Pat. No. 3,854,540 (Holmstrom) for pressure transducers in the air bag suspension. These systems are expensive, introduce reliability and maintenance issues and, in the case of combination vehicles, only work with trailers fitted with the appropriate sensors. Instead of retrofitting every semi-trailer it is desirable to install all the apparatus on-board the motive vehicle.

Previous attempts at dynamic methods of mass determination have included utilizing the resonant frequency of the drive train, U.S. Pat. No. 4,656,876, (Frend) and accelerating the vehicle, U.S. Pat. No. 7,430,491 (Gutierrez, et. al.) or decelerating, U.S. Pat. No. 6,144,928 (Leimbach, et. al.). The second two methods, in either straight trucks or combination vehicles, have required estimating or neglecting the effect of zero hertz rolling resistance and wind drag in the force or other motive signal. Since an incline would also introduce an offset to the force transducer, the determination was restricted to a level surface.

U.S. Pat. No. 6,347,269 (Hayakawa, et. al.) removes the errors introduced by zero hertz factors by eliminating the zero hertz components from both the acceleration and force signals to determine apparent mass. The method, however, is for an ideal rigid body where apparent mass equals true mass at all frequencies. Real world motor vehicles, especially semi-trailers loaded with double stacked pallets or other loosely stowed cargos that shift or deform under changes in acceleration may not be considered rigid bodies. The relative movement will cause the frequency response to deviate from that of a rigid body and the error will be too great for compliance to weight restrictions. Instead of solving that problem the Hayakawa exacerbates it by high pass filtering the signals to remove the noise resulting from low frequency changes in inclination during data gathering. High pass filtering also amplifies the high frequency noise from the interaction of surface irregularities and a vehicle suspension introducing multiple crossings errors in the rectification time averaging step. Low frequency signal bandwidth noise is a source of error but high pass filtering of the acceleration signal introduces more error than it eliminates.

The errors from resistive and spring like mechanical impedance can be greatly reduced for all vehicles currently instrumented for mass determinations just by changing the signal processing method. In the case of a fifth wheel combination vehicle fitted with a dedicated force sensing apparatus the reduction in error is enough to allow for great savings in the time and fuel wasted making trips to bridge scales.

SUMMARY OF THE THEORY FOR THE SIGNAL PROCESSING

All determinations of the mass of a rigid body generally rely on some combination of gravity and dynamic methods each falling under a fractional ν order time derivative of F=ma, Newton's Second Law. The derivative order ν in fractional calculus belongs to the set of real numbers with fractional derivatives including fractional integrals. The fractional derivatives of force can generally be called motive signals and the fractional derivatives of acceleration can generally be called motion signals. For static weighing ν equals zero where the motion signal is the acceleration of gravity, a known constant and only the motive signal, force, needs to be determined. For dynamic mass determinations, however, ν may be any positive or negative real number as well as zero. When ν equals negative one the motion signal is velocity and the motive signal is the time integral of force or impulse and the mass of a rigid body may be calculated by the quotient of the time average magnitude of impulse divided by the time average magnitude of velocity. When ν equals positive one the motion signal is the first derivative of jerk and the motive signal has been called yank. Transducers may, in fact, be constructed to directly measure yank and jerk. At least in the short term, however, it is more practical to process nu order derivatives from commercially available transducers such as load cells and speedometers.

In the frequency domain only the constant zero hertz component of the signal from a force sensor is necessary or desirable for static weighing. The acceleration of gravity is known and any vertical vibration appearing in the force signal is considered noise. With many purely dynamic determinations of mass such as moving vehicles with rolling friction the situation may be considered reversed. One or more positive frequencies in the sensors become the signals while any offset due to a drag becomes the noise. An unknown zero hertz noise cannot be subtracted from a desirable zero frequency signal. As with all determinations or mass, however, as little as one frequency is required to determine mass. Any zero hertz component of the signals is redundant and may be discarded along with the zero hertz noise. The accurate dynamic determination of the mass of a rigid body is therefore possible using a single greater than zero hertz frequency from a force, torque, yank or other motive transducer along with the appropriately processed signals from an odometer, speedometer, accelerometer, jerkometer or other motion transducer. Apparent mass is calculated from the time average magnitude of the motive signal divided by the time average magnitude of the motion signal.

The first and perhaps largest source of error in dynamic methods for road vehicles is traceable to the resistive and spring like mechanical impedance of a less than purely mass like rigid body. This error increases with jerk, the first time derivative of acceleration. Jerk is zero for zero hertz as in static weighing and increases with frequency. Jerk also varies in the time domain with some portions of the cycle contributing much more to the error than others. The error in true mass due to non rigid body behavior may, therefore, be reduced two ways, low pass filtering and squelching during high jerk portions of the cycle or, for that matter, any even order derivative or integral of jerk. Alternatively both signals may also be squelched when an odd integer order derivative or integral of jerk such as displacement or acceleration is below a threshold. For even greater confidence the frequency response or phase angle of the body may be determined from a fast Fourier transform of the signals and compared to that of similar body with a known frequency response. A correction factor may, if necessary, be applied for true mass.

The second source of error, especially in agricultural field loading operations, is low frequency noise. Low frequency noise may come from wind gusts or road surface irregularities. If the motion signal originates in a speedometer then changes in inclination may also be considered low frequency noise. If the motion signal originates in an accelerometer, however, the effect of changing inclination on the force or torque transducer is the same as on the accelerometer and it cancels in the quotient as part of the signal. Low frequency noise from wind gusts or surface irregularities may be filtered from the signals in combination vehicles if the mass of the towing vehicle is known and a force sensing apparatus between the towing vehicle and the trailer provides the force signal. All low frequency noise may either be ignored or filtered with a reference. Any noise on the towing vehicle merely modifies an already arbitrary signal and may be combined for another arbitrary signal. Low frequency noise acting on the trailer of unknown mass can be filtered with a reference derived from the equation of motion on the towing vehicle and constructed from the noisy signals themselves. This reference is impervious to phase angle or frequency response of the body and may be used for phase sensitive rectification or match filtering to attenuate the noise from one or both signals. The signal processing may be performed by software on laptop computers since the frequency of the acceleration-deceleration cycle of motor vehicles is less than half a hertz.

Fast precise determination of the weight of a semi-trailer on a potholed road or field introduces several additional issues: The force between the tractor and trailer must be measured to a precision an order of magnitude higher than the allowable error in the final mass determination. A dedicated force sensing apparatus installed between the tractor or fifth wheel dolly frame and the fifth wheel utilizing a load cell measures the longitudinal force to high precision. Considerable longitudinal noise may be induced from vertical noise on imperfect geometry of the force sensing apparatus. For a cost effective apparatus subject to impacts and abuse, this noise is preferably subtracted. Finally, for single trailer combination vehicles, axle weights may be calculated from the weight of the semi-trailer on the fifth wheel and the distribution of the weight of the fuel on the drive and steering axles. The same force sensing apparatus allows for static weighing wherever an incline is available for a convenient road side check of the dynamic system. A quotient is taken of the constant dc components of the signals.

Objects and Advantages

Accordingly, it is an object of the present invention to provide an on-board vehicle scale method that is accurate with any flexible or shifting cargo, on any surface and on any constant or changing inclination. It is also an object of the present invention to provide a method and apparatus for an on-board tractor semi-trailer scale that, (a) is accurate enough to eliminate most trips to bridge scales;
(b) is accurate enough for the crop yield maps used in precision agriculture;
(c) is convenient, safe and cost effective with all instrumentation mounted entirely on board the towing vehicle or a fifth wheel dolly without any modification of semi-trailers;
(d) adds little weight and no significant height to the combination vehicle;
(e) is rugged, easy to maintain, easy to repair, replace and upgrade;
(f) can be tailored to either original equipment or after market installation and fabricated entirely from off the shelf components;
(g) is highway safe even if the driver forgets to secure the apparatus;
(h) provides the weight of each axle of single trailer combination vehicles;
(i) can provide a static measurement on an incline as a check or calibration of the dynamic system and/or of the impedance of the cargo;
(j) can determine the normalized rolling friction of a semi-trailer as a check for dragging brakes and other mechanical problems.

DETAILED DESCRIPTION

Drawing Figures

Figure 1:
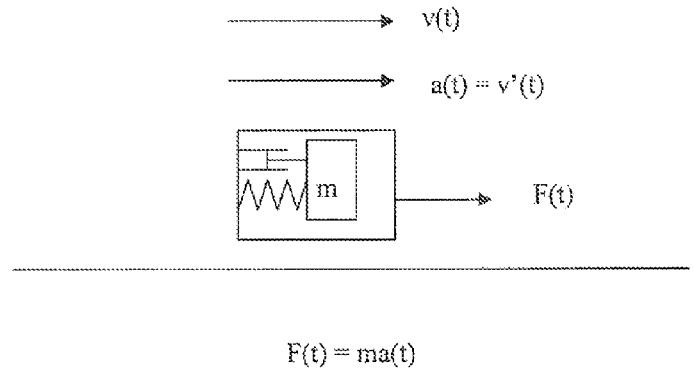
Figure 1:
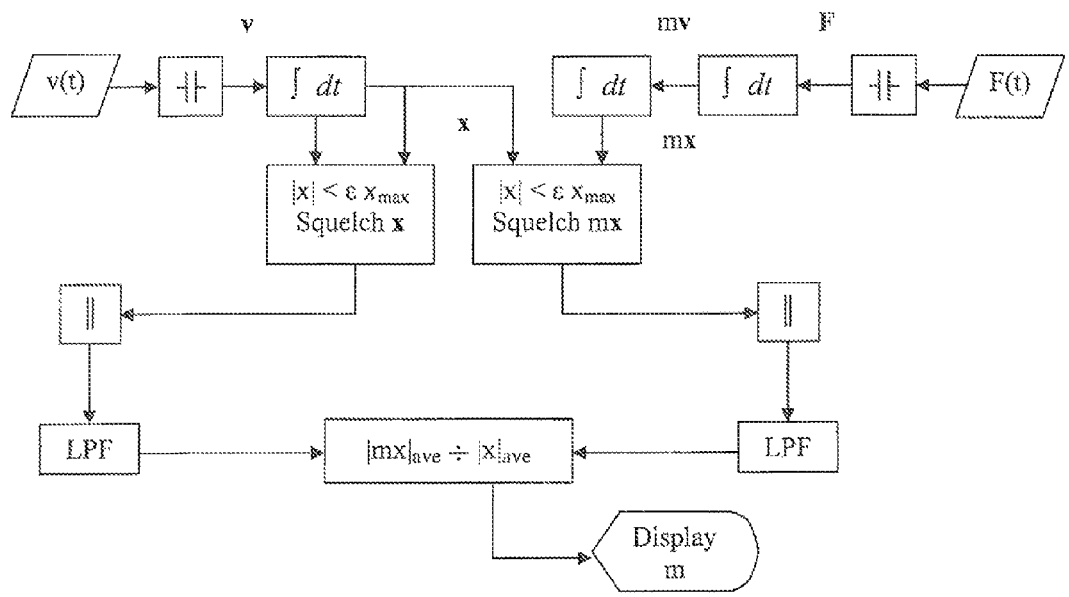
Figure 2:
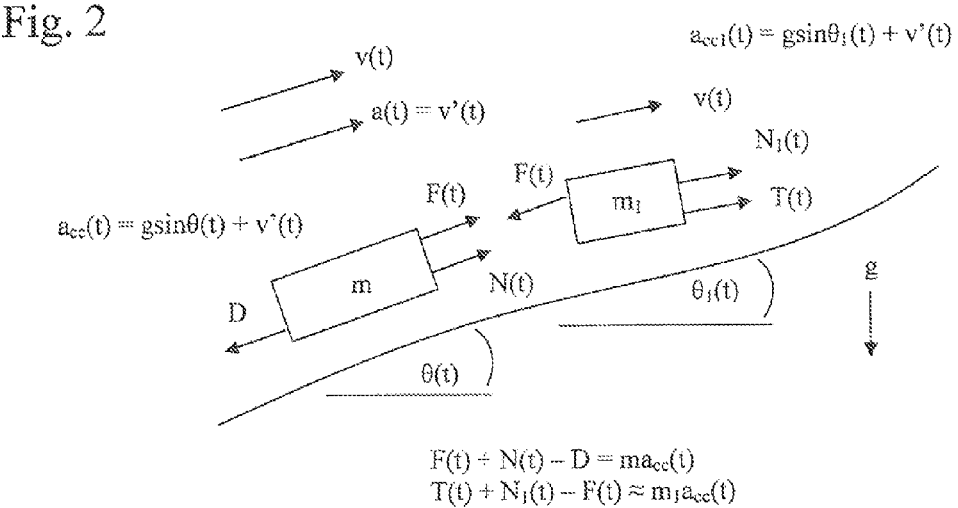
Figure 2:
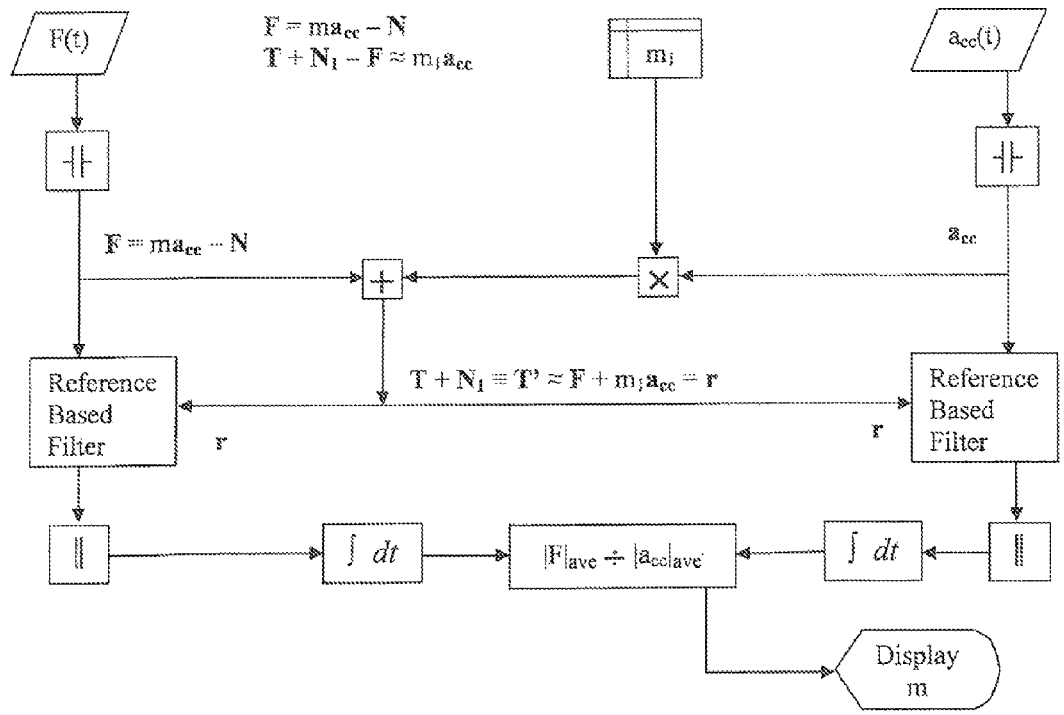
Figure 3:
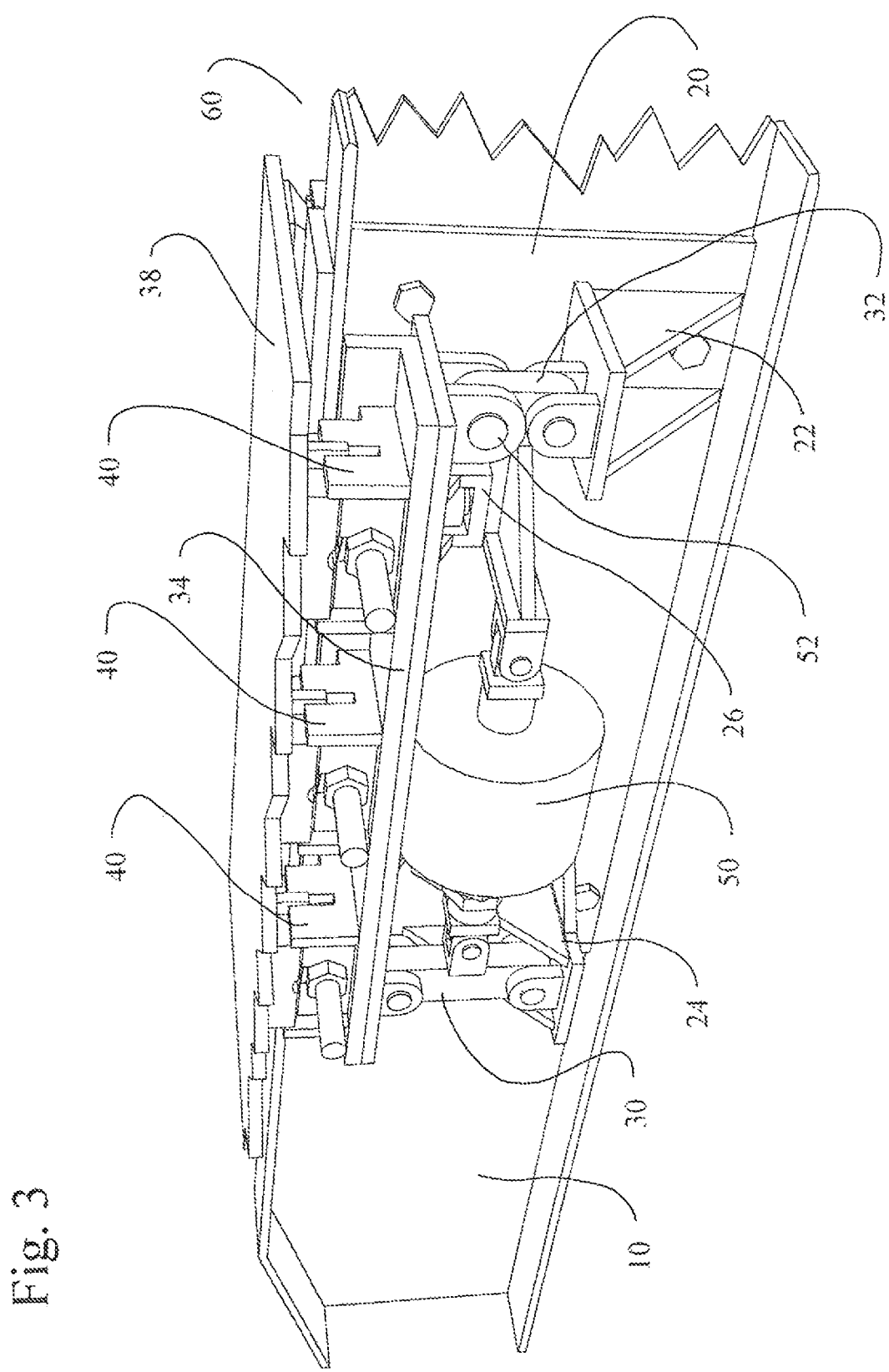

FIG. 1 Determining Mass of a Single Deformable Body
FIG. 1-A Flow Chart for Squelching Circuit to Determine True Mass
FIG. 2 Two Body Vehicle Moving On an Incline With Low Frequency Noise
FIG. 2-A Flow Chart for Signal Processing of Low Frequency Noise
FIG. 3 Perspective View of Four Bar Fifth Wheel Force Sensing Apparatus In Raised Position
FIG. 3-A Base Plate Release of Force Sensing Apparatus In Released Position
FIG. 4 Critical Dimensions for Tractor Axle Weights
FIG. 4-A Correction Factor for 3 Bar and 4 Bar Force Sensing Apparatus
FIG. 5 Flow Chart To Calculate Tractor Axle Weights
FIG. 5-A Flow Chart To Determine the Mass of A Semi-Trailer
FIG. 5-B Flow Chart for Display of Weights, Phase Angles and Normalized Friction Variables Boldface is used to indicate that a time dependent signal only has greater than zero frequency components a(t) longitudinal acceleration originating from a speedometer; a(t)=v'(t)=a
$a_{cc}$(t) longitudinal acceleration from accelerometer; $a_{cc}$(t)=v'(t)+g sin θ(t)
a greater than zero frequency components of a(t)
$a_{cc}$ greater than zero frequency components of accelerometer signal $a_{cc}$(t)
$a_s$ time average component of longitudinal acceleration from accelerometer
$a_y$(t) vertical acceleration due to surface irregularities
$a_y$ greater than zero frequency components of $a_y$(t)
D zero hertz drag from rolling resistance and steady wind
$D_n$ normalized drag
$d_1$ length of top bar in apparatus
$d_2$ longitudinal distance from fifth wheel pin to rear end of the top bar
F(t) longitudinal force from force or torque transducer
F greater than zero frequency components of F(t)
$F_s$ time average component of longitudinal force
F' F minus noise induced by $N_y$
$F_y$(t) vertical force below force gage with constant component; $F_y$(t)=$F_{ys}$+$F_y$
$F_y$ greater than zero frequency vertical force
$F_{ys}$ static measurement of vertical force below force gage; weight of front end of the trailer plus base plate to fifth wheel weight; $F_{ys}$=$w_{tf}$+$w_5$
$f_α$ correction factor for out of verticality in 3 bar or 4 bar apparatus; $f_α$=$N_y$/$F_y$
$f_c$ off drive axle centerline factor; $f_c$=$l_p$/$l_b$
$f_f$ factor for converting fuel level to fuel weight; $f_f$=$w_f$/$l_f$
$f_t$ tank location factor; $f_t$=$l_t$/$l_b$
g acceleration due to gravity
$g_c$ mass-weight conversion factor; $g_c$=9.8 kg-m/N-$s^2$
j jerk, the first time derivative of acceleration; j=a'=a'(t)=v''(t)
$l_b$ wheel base of tractor; distance from steering axle to drive axle centerline
$l_p$ longitudinal distance from drive axle centerline to fifth wheel pin
$l_t$ distance from drive axle centerline to center of fuel tank
$l_f$ fuel level in fractions or percent
LPF low pass filter
m mass to be determined; mass below longitudinal force gage; trailer mass plus base plate-to-fifth wheel mass; m=$w_t$+$w_5$
N(t) longitudinal noise on body of unknown mass, m, from surface irregularities and wind gusts; N(t)=N
$N_y$ noise on force sensing apparatus from accelerations normal to longitudinal
PSR phase sensitive rectification
r reference signal;
t data gathering time period of test
v(t) velocity in the longitudinal direction
v'(t) first derivative of velocity; longitudinal acceleration, a(t)
v greater than zero frequency components of velocity in the longitudinal direction
$w_{bl}$ bob tail weight with driver and without fuel
$w_c$ total weight of combination vehicle; FIG. 5-B
$w_{dl}$ bob tail drive axle weight with driver and without fuel; FIGS. 5, 5-B
$w_{dt}$ drive axle weight with trailer attached; FIGS. 5, 5-B
$w_f$ fuel weight; FIGS. 5, 5-B
$w_{sl}$ bob tail steering axle weight with driver and without fuel; FIG. 5
$w_{st}$ steering axle weight with trailer attached; FIGS. 5, 5-B
$w_t$ weight of trailer; FIGS. 5-A, 5-B
$w_{tf}$ weight of trailer on fifth wheel; FIGS. 5, 5-B
$w_{tr}$ trailer tandem or rear axle weight; FIG. 5-B
$w_5$ weight of the base plate to fifth wheel assembly; weight of tractor below force gage; FIGS. 5, 5-A
x(t) displacement signal in longitudinal direction
x greater than zero hertz displacement signal in longitudinal direction
α out of vertical angle between upright bar and the y axis on 3 bar; FIG. 4-A
$α_f$ out of vertical angle between upright forward bar and the y axis on 4 bar apparatus; FIG. 4-A
$α_r$ out of vertical angle between upright rear bar and the y axis on 4 bar apparatus; FIG. 4-A
ε signal amplitude ratio determining amount of squelch; FIG. 1
φ phase angle between motion and motive signals
θ(t) angle of incline between the horizontal and longitudinal x axis in radians sin θ(t)≈θ(t)
θ greater than zero frequency components of θ(t)
∫ integral; anti-derivative
⊣⊢ offset filter to eliminate zero Hz
Ⓠ fluctuating force Reference Numerals in Perspective Drawings 10 channel beam frame of fifth wheel tractor or fifth wheel dolly; FIG. 3
20 mounting plate for force sensing apparatus; FIG. 3
22 forward support for four bar; FIG. 3
24 rear support for four bar; FIG. 3
26 bearings to restrict lateral movement; FIG. 3
30 rear upright of four bar; FIG. 3
32 forward upright; FIG. 3
34 top bar; FIG. 3
36 bearings to restrict lateral movement; FIG. 3
38 base plate for mounting slider plate or fifth wheel; FIGS. 3, 3-A
40 wedge jack; FIG. 3
42 wedge jack lifting bolt; FIG. 3-A
50 canister load cell; FIG. 3
52 load pin; FIG. 3
60 base plate clamp release assembly; FIG. 3
62 positioning cone; FIG. 3-A
64 positioning seat; FIG. 3-A
70 wedge bar; FIG. 3-A
72 lower wedge bar; FIG. 3-A
74 wedge bar bolt; FIG. 3-A
76 bolt connecting base plate to lower wedge bar; FIG. 3-A The method to determine true mass of a flexible body is illustrated in FIG. 1. A single flexible body is accelerated by a fluctuating force with substantial internal relative movement so that apparent mass is significantly different than true mass. The equation of motion is, $$F(t)=ma(t)$$

where F(t) is a fluctuating propulsive force, m is mass and a(t) is the acceleration. In the signal processing flow chart, FIG. 1-A, the velocity signal is integrated once and the force signal twice. Both signals are then squelched when the integrated velocity or displacement, x, signal falls below ε, a squelch factor, times the maximum value of the displacement, x. The magnitudes are then determined by taking the quotient of the low pass filtered or integrated rectified signals. This is the simplest form of squelching. Other approaches are possible such as squelching by the first derivative of force or any combination of motive or motion signals. The relative internal movement has a delay so a time delay may provide better results when the internal movement is excessive or spring like.

The method to filter low frequency noise from a two body vehicle is illustrated in FIG. 2. A vehicle of unknown mass, m, is accelerated by a fluctuating force, F(t), exerted by a towing vehicle of known mass, $m_1$, on a surface where inclination angle is an unknown function of time. The body is also subject to wind gusts and surface irregularities which are also an unknown function of time, N(t). The equation of motion of the vehicle of unknown mass is therefore, $$F(t)=D-N(t)+mg \sin \theta(t)+mv'(t)$$

An accelerometer output, $a_{cc}(t)$ includes both the terms, $g \sin \theta(t)$ as well as v'(t). Using an accelerometer for the motion sensor the equation of motion becomes, $$F(t)=D-N(t)+ma_{cc}(t)$$

Low frequency noise N(t) may be filtered with a reference, r, derived from the greater than zero hertz frequencies equation of motion of the towing body:

$$T+N_1-F \approx m_1 a_{cc}$$

$N_1$ merely modifies an already arbitrary signal T and may be combined with T for T', $$T' \approx F+(m_1)a_{cc}$$

The waveform of T' is close to that which both F and $a_{cc}$ would have without N(t) and may be used as a reference, r, to filter both F and $a_{cc}$. Eliminating F(t) from both equations of motion and combining $m_1$ with m reduces to the single body vehicle problem allowing low frequency filtering with a drive train torque signal, F(t). The reference becomes, $r \approx F+ma_{cc}$. Mass, m, must be initially estimated and iteratively substituted into the data. Either reference may be used in match filtering, phase sensitive rectification or any other reference based filtering.

The left half of one preferred embodiment for a force sensing apparatus for a fifth wheel towing vehicle is depicted in FIG. 3. The four bar single degree of freedom movement consists of forward upright 32, rear upright 30, and top bar 34 mounted on instrument assembly plate 20 that bolts onto the inside of the towing vehicle's channel frame just under the fifth wheel or slider plate. Canister load cell 50 mounted between rear upright 30 and assembly plate 20 measures longitudinal force, F(t). Load pin 52 on the top of forward upright 32 measures the vertical force, $F_{ys}$ for the determination of the static weight on the fifth wheel. Wedge jacks 40 transfer the weight on the fifth wheel from the top of the tractor frame to the force sensing apparatus by raising base plate 38 just enough to clear tractor frame 10.

Wedge jack bolts 42 are shown in FIG. 3-A and wedge jacks 40 may be cranked up or down with an air wrench powered by the tractor's air compressor. Wedge bar 70 is reinserted and tightened to clamp the base plate securely to tractor frame 10 and positioning seats 64.

Critical points for the determination of tractor axle weights are shown in FIG. 4. The longitudinal distance to the drive axle centerline to the center of the fuel tank, $l_f$, divided by the wheelbase, $l_b$, is equal to tank location factor, $f_t$. The longitudinal distance from the drive axle centerline to the fifth wheel pin, $l_p$, divided by the wheelbase, $l_b$ is the off drive axle centerline factor, $f_c$.

The correction factor, f.sub..alpha., for any imperfect geometry in either the three bar apparatus illustrated in FIG. 4-A or the four bar apparatus illustrated in FIG. 4-B is most accurately determined during calibration or recalibration by comparing the outputs of the load cell to the load pin as a vertical load is applied.

FIG. 5 is the flow chart for the determination of tractor axle weights. Vertical static force on the apparatus, $F_{ys}$, and the fuel level, $l_f$, are entered into the monitor. The following quantities were previously entered during the set up and calibration: base plate to fifth wheel weight, $w_5$; bob tail steering axle weight, $w_{si}$; bob tail drive axle weight, $w_{di}$; bob tail weight, $w_{bi}$; fuel weight conversion factor, $f_j$; off drive axle centerline factor, $f_c$; and tank location factor, $f_t$. The monitor then calculates the following: the mass of the tractor minus the base plate to fifth wheel weight, $m_1$; fuel weight, $w_f$; the loaded drive axle weight, $w_{dt}$, the loaded steering axle weight, $w_{s1}$; the weight of the front end of the trailer resting on the fifth wheel, $w_{tf}$.

The flow chart for the dynamic determination of the trailer mass, phase angle and rolling resistance is illustrated on FIG. 5-A. The signal processing includes squelching as well as match filtering of low frequency noise. The out of verticality factor, $f_\alpha$, and base plate to fifth wheel weight, $w_5$, are entered during set up and calibration. Mass, $m_1$, and front end trailer weight, $w_{tf}$ were calculated during the static determination on FIG. 5. The continuous inputs are, the acceleration from a vertical axis accelerometer, $a_y(t)$, the longitudinal force from the force sensing apparatus, F(t), and longitudinal acceleration from a longitudinal axis accelerometer, $a_{cc}(t)$. After data acquisition the monitor calculates total trailer weight, $w_t$, and generates the phase angle, $\phi$, and the time average of $a_{cc}(t)$, $a_s$, and the time average of F(t), $F_s$.

The outputs for axle weights, phase angle and normalized rolling friction are retrieved or calculated and displayed according to the flow chart in FIG. 5-B. The vertical force on the fifth wheel, $w_{tf}$ is subtracted from the total mass of the semi trailer, $w_t$, to determine the weight on the rear tandem, $w_{tr}$. The monitor adds the trailer weight, wt, to the bob tail weight, $w_{bt}$, and fuel weight, $w_f$, to determine total combination vehicle weight, $w_c$. The monitor also retrieves and outputs the drive axle weight, $w_{dt}$ and steering axle weight, $w_{st}$, calculated by the FIG. 5 flow chart. The time average of the force signal, $F_s$, and the acceleration signal, $a_s$ are used to calculate drag, D, which is then divided by the rear tandem weight, $w_{tr}$, for normalized drag, $D_n$. The phase angle, $\phi$, determined by FIG. 5-A flow chart, is also displayed.

Advantages

From the description above a number of advantages of the signal processing method for determining the mass of a body become apparent:

(a) The mass of a flexible body may be more accurately determined.

(b) The mass of a body accelerated by a propulsive body of known mass, both subject to low frequency noise may be determined to the highest degree of precision in the shortest possible period of time.

(c) The accuracy of conventional on-board vehicle weighing apparatus can be greatly improved simply by changing the signal processing to this method.

(d) In addition to the advantages of the method above the mass of a semi-trailer can be accurately and quickly determined with a cost effective on-board apparatus that can be used with any semi-trailer greatly reducing the time, fuel and fees required visiting commercial bridge scales.

(e) The weight of trailers loaded during farm operations may be determined in near real time for precision agriculture.

(f) The off loading and reloading of produce during farm operations may be greatly reduced.

Operation of Fifth Wheel Apparatus for Dynamic Test—FIGS. 3, 3-A

For dynamic measurement of semi-trailer mass the driver shifts the fifth wheel slider plate to the calibration position, indicated by a mark on the slider plate. The semi trailer must then be lined up with the tractor in a location with a clear area in front of the vehicle for the measurement. The driver turns on the monitor which may be a program on a laptop and selects dynamic weight test. The fuel level is entered. Both tractor and trailer brakes are set and wedge bar 70 is extracted by loosening wedge bar bolts 74. Wedge jacks 40 are raised until base plate 38 and positioning cones 62 clear seating surfaces including positioning seats 64. The force on load pin 52 is entered into the monitor. The brakes are released and the combination vehicle is then accelerated to the proper gear. While maintaining a constant velocity idling in gear the monitor is initialized to commence the dynamic test. The test preferably should be conducted to mimic as much as possible the acceleration-deceleration profile of the calibration. For example, if engine braking was used during the calibration then engine braking should be used during the test. Deceleration should not bring the vehicle to a complete halt during the test. After one or more acceleration deceleration cycles the monitor calculates and displays the total semi-trailer weight, the axle weights, the phase angle, phi, and normalized rolling friction along with the date and time.

Static Test on an Incline

The same apparatus can make a purely static gravity only determination of mass by parking the combination vehicle on a substantial if unknown incline for a vibration free measurement. The tractor brakes are applied, the trailer brakes are released and the longitudinal component of acceleration due to gravity and may be measured directly with the same accelerometer used in a dynamic mass determination. The longitudinal component of force, F, on the fifth wheel is measured by the longitudinal force load cell. The magnitude of the incline angle term cancels out in the quotient.

Agricultural Fifth Wheel Dolly and Test Stand

A fifth wheel dolly set up for real time weights during a field loading operation would make an ideal prototype vehicle. An instrumented fifth wheel dolly need not ever be hitched to a trailer on the road so safety isn't the same issue in the field as on the road. The base plate release could, therefore, be eliminated. The same fifth wheel dolly may be used to load and weigh dozens of trailers a day so it is more cost effective to use rugged hydraulic load cells, force-balance accelerometers and other performance items. Air jacks cost more than wedge jacks but hold up well in dusty environments and by operating at air brake supply pressures are convenient to deploy. Air jacks also satisfy the short stroke heavy lift requirement.

Conclusions, Ramifications and Scope

The two major sources of error in on-board vehicle mass determination, low frequency noise and non massive impedance, have been identified and solutions have been provided.

In the case of a semi-trailer the noise on the unknown mass can be eliminated by match filtering or phase sensitive rectification. The weight of a semi-trailer can be quickly determined with high accuracy on any surface of any inclination or any changing inclination eliminating trips to truck scales saving time, fuel, scale fees while keeping produce fresher.

The scope of this invention should be determined by the appended claims and their legal equivalents rather than by the examples given.

I claim:

1. A method to determine the mass of a body subject to drag over a period of time compromising the steps of:
   (a) changing the velocity of said body with a fluctuating force;
   (b) providing a means of producing a signal over said period of time representing a sum of not less than one greater than zero frequency components for a motive signal;
   (c) providing a means of producing a signal over said period of time representing a sum of not less than one greater than zero frequency components for a motion signal;
   (d) providing a means of determining the time average magnitude of said motive signal for a time average motive signal;
   (e) providing a means of determining the time average magnitude of said motion signal for a time average motion signal;
   (f) calculating the mass of said body by taking the quotient of said time average motive signal divided by said time average motion signal.

2. The method of claim 1 where the order of the fractional derivative of force proportional to said motive signal is less than the order of the fractional derivative of velocity proportional to said motion signal by the integer one.

3. The method of claim 2 with the additional steps of,
   (a) providing a means of producing a squelching signal proportional to the absolute value of a combination of not less than one signal selected from the group of signals proportional to even order fractional derivatives of jerk and yank signals derived from said motion and said motive signals;
   (b) providing a means of changing the magnitudes of both signals when said squelching signal crossed a threshold with the effect of weighting both signals more when said squelching signal is below said threshold.

4. The method of claim 2 with the additional steps of,
   (a) providing a means of producing a squelching signal proportional to the absolute value of a combination of not less than one signal selected from the group of signals proportional to odd order fractional derivatives of jerk and yank signals derived from said motion and said motive signals;
   (b) providing a means of changing the magnitudes of both signals when said squelching signal crossed a threshold with the effect of weighting both signals more when said squelching signal is above said threshold.

5. The method of claim 3 where said motive signal originates in a longitudinal force sensing apparatus measuring force exerted by a towing vehicle on a trailer.

6. The method of claim 4 where said motive signal originates in a longitudinal force sensing apparatus measuring force exerted by a towing vehicle on a trailer.

7. The method of claim 2 where the velocity of said body of unknown mass is changed by a force exerted by a body of known mass and noise in said motion signal is filtered using a reference signal constructed from said motive signal and not less than zero additional signals.

8. The method of claim 2 where the velocity of said body of unknown mass is changed by a force exerted by a body of known mass and noise in said motive signal is filtered by a reference signal constructed from said motion signal and not less than zero additional signals.

9. The method in claim 7 where said reference signal is used in a reference based filtering technique selected from the group including phase sensitive rectification, Wiener filtering and matched filtering.

10. The method in claim 8 where said reference signal is used in a reference based filtering technique selected from the group including phase sensitive rectification, Wiener filtering and match filtering.

11. The method in claim 9 to determine the weight of a semi-trailer accelerated by a fifth wheel vehicle where said motive signal originates from a longitudinal force sensing apparatus mounted between the fifth wheel and the frame of said fifth wheel vehicle.

12. The method in claim 11 where said motion signal originates in a sensor selected from the group of sensors including speedometers, displacement meters, and accelerometers.

13. The method of claim 3 where said motive signal originates in the drive train of a motor vehicle.

14. The method of claim 4 where said motive signal originates in the drive train of a motor vehicle.

15. The method of claim 2 where said motive signal originates in the drive train of a motor vehicle and said motion signal is filtered with a reference signal constructed from said motive signal.

16. The method in claim 15 where said reference signal is used in a reference based filtering technique selected from the group including phase sensitive rectification, Wiener filtering and matched filtering.

17. The method of claim 9 where said body of unknown mass is rail road rolling stock and said body of known mass is selected from the group including rail car movers, yard locomotives and locomotives.

18. The method in claim 1 where said motive signal is proportional to complex force and said motion signal is proportional to complex velocity and a Fourier transform is taken of both said motive signal and said motion signal and the frequency response of said mass is determined so that apparent mass may be calculated at each frequency by dividing said motive signal by said motion signal at each respective frequency.

19. The apparatus in claim 11 where said tractor and said semi-trailer are parked on an incline with said semi-trailer brakes released and said tractor brakes applied and said constant longitudinal component of force is divided by said constant longitudinal component of acceleration for a static determination of trailer weight.

* * * * *